July 27, 1965
L. J. A. EMARD
3,196,573
FISHING LURE
Filed Jan. 18, 1963
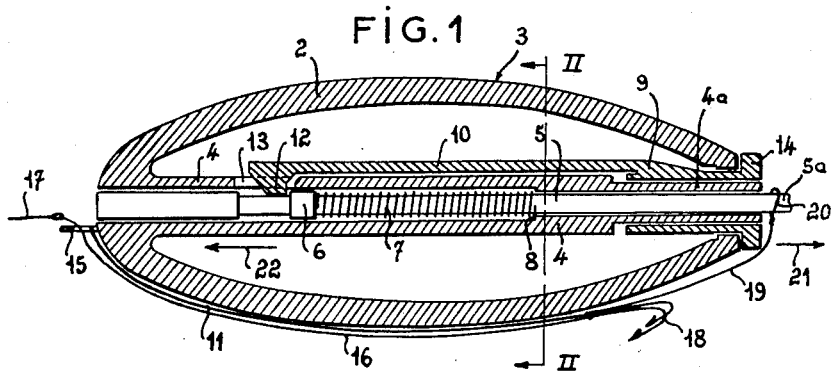
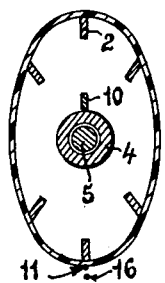
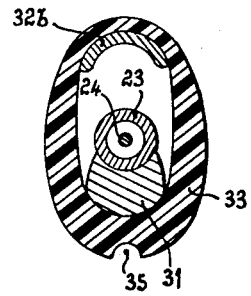
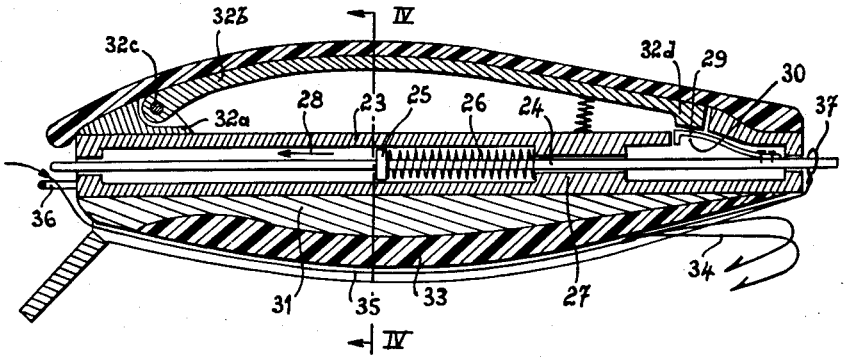
INVENTOR.
LEÓN JOSEPH ARSÈNE EMARD
BY
Karl G. Ross
AGENT

United States Patent Office 3,196,573
Patented July 27, 1965

3,196,573
FISHING LURE
Léon Joseph Arsène Emard, 3 Rue d'Orléans,
Nantes (Loire-Atlantique), France
Filed Jan. 18, 1963, Ser. No. 252,454
Claims priority, application France, Jan. 29, 1962, 42,245,
Patent 1,320,883; Nov. 29, 1962, 43,090, Patent 82,696
5 Claims. (Cl. 43—35)

My invention has for its object a fishing lure of which the hook or hooks are arranged laterally of the lure body at the end of the angling line and are normally held fast, such that in the case of the lure being engaged transversely or longitudinally by a fish, the hook or hooks are released and are drawn along the body of the lure until the fish is struck through the tensional stress exerted by the angler on the line.

In one embodiment of my invention, the lure is provided with an annular set of longitudinally extending bars, having corresponding ends rigid with a central tubular shank or body; the rear end of a slidable rod in the body serves for releasably carrying the hook or hooks while the rear end of said shank or body serves as an inner guide for a sleeve engaged by the rear ends of the above-mentioned bars, said sleeve being rigid with a further bar, the front end of which terminates in a projection engaging an opening formed in the tubular shank and holding normally a shoulder on said central rod against the force of a spring. The spring urges the rod forwardly and releases said shoulder and consequently the rod when a fish takes the bait so that the longitudinal bars, constituting a deformable portion of the body, urge the sleeve rearwardly and shift the shoulder-retaining projection out of the tubular body.

The hook or hooks are thus released and, by reason of the pull exerted by the angler on the line, they efficiently strike the fish which holds the body of the lure fast, while tension is exerted on the hook or hooks.

According to a further feature of my invention, the striking of the fish is improved and obtained in a more automatic manner by reason of the hook being secured not only to the line but also to a spring which is tensioned when the hook is in its operative set position.

I have described hereinafter and illustrated diagrammatically in the accompanying drawings, by way of example and in a nonlimiting sense, two embodiments of the fishing lure.

In said drawings:

FIGS. 1 and 2 are respectively a longitudinal cross-sectional view and a transverse cross-section (along line II—II of FIG. 1) of a first embodiment of my improved lure.

FIGS. 3 and 4 are similar views of a second embodiment (FIG. 4 being taken along line IV—IV of FIG. 3).

In FIGS. 1 and 2, 2 designates small bars, constituting the inwardly deformable portion of the body and six in number, which are arranged longitudinally inside a casing 3 made of plastic material, or else, they are embedded in plastic, rubber or a like soft material, said bars being rigidly secured at their front ends with a tubular shank 4 which constitutes a guide for a central rod 5. The rear end of said rod 5 extends normally beyond the tubular shank 4, while it is provided inside said shank with a shoulder 6 facing rearwardly and engaged by the front end of a helical spring 7 extending coaxially with said rod, while the rear end of said spring engages a shoulder 8 formed inside the shank 4 and facing forwardly. At its rear end, the tubular shank 4 is provided with a section 4a of a reduced diameter on which is slidingly fitted a sleeve 9 rigid with a forwardly directed extension formed by a small bar 10 terminating with a nose or projection 12 engaging the tubular shank 4 after passing through an opening 13 formed in the latter. At its rear end, the sleeve 9, which constitutes a coupling means according to the invention, forms an outer flange 14 engaging the rear ends of the longitudinal outer bars 2.

At its front end, the body of the lure is provided with a projecting guide 15 through which passes a thread 16 connected with the angling line 17 at one end and carrying one or more hooks 18 at its other end. Additional thread 19 is connected to said hooks and extends rearwardly therefrom and terminates in a loop 20 which engages the free rearwardly projecting end 5a of the central rod 5. Lastly, an elastic connection 11 connects the hook or hooks 18 with the projecting guide 15. Said connection is tensioned when the loop 20 of the thread 19 is engaged by the rear end 5a of the rod 5.

It should be remarked however that it is possible to hold the hook or hooks 18 against the body of the bait through engagement with the central rod 5 only when the rear end 5a of said rod projects beyond the shank 4. To this end, the shoulder 6 on the rod 5 must be held in position by the nose 12 on the bar 10, against the force of the spring 7 between said shoulder and the shouldered section 8 of the shank 4.

When a fish swallows transversely or longitudinally the bait, the compression of the body of the bait by the mouth of the fish deforms the bars 2 to an extent such that their central sections are urged towards the central tubular shank 4, while their free rear ends move rearwardly and urge in the same direction the flange 14 on the sleeve 9. This shifting of the sleeve 9 in the direction of the arrow 21 together with the small bar 10 releases the projection 12 from the channel defined by the opening in the tubular shank 4. Consequently, the shoulder 6 on the rod 5 is no longer held back by said projection 12 and the spring 7 expands and produces a sudden shifting of the rod 5 forwardly, i.e. in the direction of the arrow 22. The rear end 5a of the rod 5 is thus withdrawn completely into the tubular shank 4 and disengages the filament 19 and releases the hook 18. The elastic connection 11 is thus freed suddenly and carries along with it forwardly the fishing hook 18 so as to produce an instantaneous and automatic striking of the fish. Said striking of the fish by the hook is further assisted by the pull exerted by the fisher on the angling line 17 at the moment at which he feels the fish has taken the bait.

In the embodiment illustrated in FIGS. 3 and 4, 23 designates a rigid tubular shank through which a central rod 24 extends longitudinally and the length of which is larger than that of the shank 23. Said rod 24 is provided with a shoulder 25 serving as a bearing surface for the front end of a spring 26 the rear end of which engages a shoulder 27 formed inside the tube 23. The spring has thus a tendency to shift the rod 24 in the direction of the arrow 28. The rod 24 is provided at its rear end with a tongue 29 adapted to pass through an opening 30 provided in the wall of the tubular shank 23. Consequently the rod 24 remains motionless and cannot be shifted in the direction of the arrow 28, although the spring 26 is compressed, when the tongue 29 engages the opening 30. The rear end of the rod 24 projects to a substantial extent beyond the rear end of the tubular shank 23.

The shank 23 carries a weight 31 and also a support 32a to which a small bar 32b is pivotally secured at 32c. The bar and weight are held in position on the tubular shank 23 by a casing 33, constituted for instance of plastic material or rubber, said casing being open at both ends so as to allow the passage through said ends of the corresponding ends of the central rod 24.

The small bar 32b is secured to the rigid tubular shank 23 only through the pivotal connection 32c at its front end, while its free rear end extends above the outer edges of the tongue.

The body of the lure is associated with a hook 34 of a type well-known per se, which is secured to the end of an angling line 35 passing through a ring 36 provided at the front end of the tubular shank 23. Beyond the hook 34, the angling line 35 extending alongside the casing 33 terminates with a small ring 37 which may be engaged over the rear end of the central rod 24, as illustrated in FIG. 3. As in the case of the bait illustrated in FIG. 1, the lure may obviously be provided with an elastic connection with the hook with a view to an automatic striking of the fish.

The operation and manner of using the last-mentioned embodiment of my improved bait are easy to understand: the bait being in its set position, that is, in the position illustrated in FIG. 3, the hook 34 is held laterally alongside the body of the lure, while the spring 26 is in its compressed condition. Assuming a fish swallows transversely or longitudinally the lure (i.e. compresses the casing 33), a pressure is exerted by the free end 32d of the small bar 32b on the tongue 29 and causes the release of said tongue which passes through the corresponding opening 30 in the central rigid tubular shank 23. The rod 24, being then no longer held in position by the tongue 29, is shifted suddenly forwardly through extension of the spring 26 and consequently the rear end of said rod 24 releases the ring 37 secured to the end of the angling line 35. The hook 34 is thus no longer held laterally against the body of the bait so that any traction exerted on the angling line 35 leads to an efficient striking of the fish.

What I claim is:

1. A fishing lure mountable on an angling line, comprising a casing including a series of slightly arcuate yieldable bars arranged in annular formation about an axis and interconnected at their front ends, means engaging the angling line at said front ends and a yielding cover enclosing said bars, a tubular shank extending along said axis, rigid with said interconnected ends and the wall of which is provided with a perforation, a central rod extending inside said tubular shank and adapted to project rearwardly beyond the latter, said central rod being provided with a forwardly facing shoulder normally registering with the perforation in the shank, a spring urging the rod forwardly to make it recede inside the shank, at least one hook carried by the angling line, a loop carried by the rearwardly projecting end of the central rod and secured to the hook to hold the latter normally in contacting relationship with a predetermined portion of the outer surface of the casing, a sleeve slidingly fitted over the rear end of the tubular shank and including a flange holding normally the rear ends of the bars in position and a forwardly extending section terminating with a transverse projection normally extending through the perforation in the shank into engagement with the shoulder on the central rod to hold the latter in its rearwardly projecting position, the deformation of the casing when swallowed by a fish flattening the casing bars and urging the flange on the sleeve rearwardly to thereby release the shoulder on the central rod with reference to the projection on the shoulder on the forwardly extending section of the sleeve and remove the rod from the loop and thereby allow the hook to be drawn over the casing and to strike the fish.

2. A fishing lure to be secured to an angling line comprising a deformable casing having a front end engageable by said line, a tubular shank receivable within said front end of the casing, a central rod extending inside said tubular shank and adapted to project rearwardly beyond the latter, a spring urging said rod forwardly to make it recede inside the shank, at least one hook carried by the angling line, a loop carried by the rearwardly projecting end of the central rod and secured to the hook to hold the latter normally in contacting relationship with a predetermined portion of the outer surface of the casing, detent means for normally holding the casing in its nondeformed condition and the central rod in its rearwardly projecting position against the force of said spring; and additional means whereby the deformation of the casing when swallowed by a fish urges said detent means into a position releasing the central rod and thereby makes the latter disengage the loop and the hook to allow the latter to be drawn along the casing and to strike the fish.

3. A fishing lure mountable on an angling line, comprising an elongated body having at least one inwardly deformable portion; at least one hook secured directly to said line; releasable retaining means in said body connectable with said hook for holding said hook proximal to said body, said retaining means including a rod extending longitudinally in said body and longitudinally displaceable therein between a first position wherein an extremity of said rod emerges from said body and a second position wherein said extremity is withdrawn into said body, and a spring biasing said rod into said second position, said hook being disposed wholly externally of said body, a loop affixed to said hook and releasably engageable with said extremity in said first position of said rod; and coupling means within said body triggerable by said deformable portion for actuating said retaining means to release said hook therefrom and permit said hook to be drawn away from said body.

4. A fishing lure mountable on an angling line, comprising an elongated body having at least one inwardly deformable portion; at least one hook secured directly to said line; releasable retaining means in said body connectable with said hook for holding said hook proximal to said body, said retaining means including a rod extending longitudinally in said body and longitudinally displaceable therein between a first position wherein an extremity of said rod emerges from said body and a second position wherein said extremity is withdrawn into said body, and a spring biasing said rod into said second position, said hook being disposed wholly externally of said body, a loop affixed to said hook and releasably engageable with said extremity in said first position of said rod; and coupling means within said body including a radially displaceable element maintaining said rod in said first position and triggerable by said deformable portion for releasing said retaining means to disengage said hook therefrom and permit said hook to be drawn away from said body.

5. A fishing lure as defined in claim 4 wherein said body includes a flexible casing, said deformable portion being a pivotable member within said casing, said coupling means comprising detent means on said rod operable by said member.

References Cited by the Examiner

UNITED STATES PATENTS

| 1,354,952 | 10/20 | Bullock | 43—35 |
| 1,869,111 | 7/32 | McLaughlin | 43—35 |
| 2,205,773 | 6/40 | Fox | 43—37 XR |
| 3,081,572 | 3/63 | Tomsello | 43—35 |

FOREIGN PATENTS

| 1,049,090 | 8/53 | France. |

ABRAHAM G. STONE, *Primary Examiner.*